Sept. 26, 1961 A. M. NELSON ET AL 3,001,549

HIGH SPEED VALVE ASSEMBLY

Filed Sept. 23, 1957 6 Sheets-Sheet 1

INVENTORS:
Alfred M. Nelson
Vernon E. Mondt
Hans M. Stern

By Smyth & Roston
Attorneys

INVENTORS:
Alfred M. Nelson
Vernon E. Mondt
Hans M. Stern
By Smyth & Roston
Attorneys.

Sept. 26, 1961 A. M. NELSON ET AL 3,001,549

HIGH SPEED VALVE ASSEMBLY

Filed Sept. 23, 1957 6 Sheets-Sheet 3

INVENTORS:
Alfred M. Nelson
Vernon E. Mondt
Hans M. Stern

By Smyth & Roston
Attorneys.

Sept. 26, 1961 A. M. NELSON ET AL 3,001,549

HIGH SPEED VALVE ASSEMBLY

Filed Sept. 23, 1957 6 Sheets-Sheet 4

INVENTORS:
Alfred M. Nelson
Verne E. Mondt
Hans M. Stern

By Smyth & Roston
Attorneys

INVENTORS
Alfred M. Nelson
Vernon E. Mondt
Hans M. Stern
By Smyth & Roston
Attorneys INVENTORS:
Alfred M. Nelson
Vernon E. Mondt
Hans M. Stern By Smyth & Roston Attorneys United States Patent Office 3,001,549
Patented Sept. 26, 1961

3,001,549
HIGH SPEED VALVE ASSEMBLY

Alfred M. Nelson, Torrance, Vernon E. Mondt, Los Angeles, and Hans M. Stern, Culver City, Calif., assignors to Magnavox Company, Los Angeles, Calif., a corporation of Delaware Filed Sept. 23, 1957, Ser. No. 685,581
14 Claims. (Cl. 137—625.27)

The present invention relates to card processing systems and more particularly to an improved type of high speed bi-stable valve assembly for general utility but especially adapted for use in such systems.

Digital techniques have been used in the data processing field for storing a wide variety of information and data and to assimilate such data for future use. The desired information in many types of data processing systems is recorded on a plurality of individual cards. Each of these cards is provided with a number of positions for storing columns of bits of information, which bits cooperate to represent the data in accordance with a binary code. The individual bits of information may be represented by patterns of holes or by magnetic areas of one polarity or another. Other appropriate techniques and arrangements may also be used for recording the information on the individual cards.

Copending application Serial No. 645,640, filed March 12, 1957, now Patent No. 2,965,291, in the names of Robert M. Hayes et al., for example, describes a data processing system which utilizes such individual cards, the information being recorded on the cards by the use of magnetic areas of one polarity or another. In the system of the copending application, the cards are stored in a stacked relationship in card holders at a storing station. This station is disposed adjacent a vacuum transporting drum of the type described, for example, in copending application Serial No. 600,975, filed July 30, 1956, now Patent No. 2,883,189, by Loren Wilson. The vacuum transporting drum operates in conjunction with other drums to transport the cards from the storing station past groups of transducer heads mounted adjacent the drums. These heads serve to process the cards and to develop control signals. The control signals are used to actuate gate transfer mechanisms, which respond to these signals to control the transfer of the cards from one drum to another for the processing of the information in accordance with such transfer. The control signals from the transducer heads also control the feed of cards from selected ones of the card holders and also control the depositing of cards into selected ones of the card holders.

In systems such as those described in the aforementioned Patent No. 2,965,291, it is possible quickly and efficiently to select desired ones of the stored cards for processing. That is, any desired one or more of the stored cards may be rapidly made available so that the data recorded on such cards may be read and used or so that new data may be recorded on the selected card or cards.

Similar systems have been devised which also make use of vacuum transport drums and associated card holders for quickly sorting, collating or otherwise dealing with the stored cards. Such processing may occur in accordance with any selected portion of the information recorded on each card. Systems of this general type, for example, are disclosed and claimed in the commonly assigned copending application Ser. No. 566,404, filed February 20, 1956, by J. B. Wiener; and in copending application Ser. No. 596,222, filed July 6, 1956, by Robert Hayes et al.

In each of the systems referred to in the preceding paragraphs, gate transfer mechanisms of the type mentioned above are provided for controlling the transfer of the cards between adjacent ones of the vacuum transporting drums. Such gates are operated and controlled by suitable electronic control systems as noted above.

The commonly assigned copending application Ser. No. 562,154, filed January 30, 1956, by Stuart L. Peck, et al., discloses gate transfer mechanisms which are suitable for the purposes described above. These mechanisms are controllable to direct streams of fluid, such as air, under pressure toward the periphery of a transporting drum. These streams function to peel the cards from the periphery of that drum and to bring such cards under the influence of the vacuum pressure of the adjacent drum.

The pressurized fluid supply to the gate transfer mechanisms such as those disclosed in the copending application Ser. No. 562,154 may most conveniently by controlled by electro-magnetically actuated valves. The present invention provides such an electro-magnetically actuated valve assembly which is especially adapted for this purpose. However, it will be apparent as the description proceeds that the valve assembly of the invention is capable of general application in the many fields where such valves are required.

An important feature of the assembly of the present invention is the extremely high rate of speed at which the valve can be operated. This renders the assembly ideally suited for use in data processing systems of the type referred to above. This obtains because the high operating and response speeds of the valve make it possible for the data processing systems to control the processing of a large number of information cards in a relatively short time. This is extremely important in relatively large and complex data processing systems because such systems may use many hundreds of thousands of individual cards. It is therefore essential to reduce the processing time for each card as much as possible. A constructed embodiment of the valve assembly of the invention, for example, has been operated at rates in the order of 150 open-close valve operations a second. Also, the response time of the constructed embodiment was such to provide full flow of air from a nozzle jet in less than two milliseconds after the application of a control pulse.

The valve assembly and system of the invention is capable of the extremely high speed operation referred to above, and this high speed operation is obtained without any material attendant unwanted bounce conditions of the valve closure member with respect to its seat. Instead, the closure member positively closes and opens in each operational cycle to provide efficient and clean valve action.

Another important aspect of the invention in its illustrated embodiment is the inherent bi-stable nature of the assembly. The assembly is constructed to respond to a current pulse of one polarity in its actuating winding to assume one of its operating conditions. The assembly then responds to a second current pulse of opposite polarity to assume its other operating condition. Also, the valve is rigidly held in each instance in its actuated condition after the termination of such pulse and until the occurrence of the succeeding pulse, this being achieved by the fluid pressure in the valve.

For example, a first current pulse of a particular polarity through the actuating winding of the valve will cause the valve to assume a closed condition. This condition is maintained by the fluid pressure in the valve after the termination of the first pulse. Then, the next succeeding current pulse of opposite polarity causes the valve to assume an open condition. This open condition is then maintained by the fluid pressure in the valve after the end of that pulse and until the next succeeding pulse causes the valve to close.

The operation described above permits a convenient control of the valve by means of extremely short current pulses. Successive ones of the pulses may actuate the valve from one operating condition to the other, and the valve is held in its particular actuated operating condition in the interval between the successive pulses. This enables the valve to be held in either one of its operating conditions without requiring a sustained current flow through its actuating winding. The actuating winding of the assembly may, therefore, have a relatively low power rating. This results in extremely small size and high efficiency for the valve assembly of the invention.

In addition, as will become apparent as the description proceeds, the valve assembly of the invention is capable of bi-stable dual operation. That is, the assembly can be constructed to direct fluid under pressure from a common inlet to either of two exhaust ports depending upon the operating condition of the valve.

In general, therefore, the invention provides a valve assembly and a system incorporating the same. The assembly is capable of efficient and stable operation at extremely high speeds. The valve is relatively small in size, it is relatively economical to build and operate, and it requires relatively low driving power.

Figure 1:
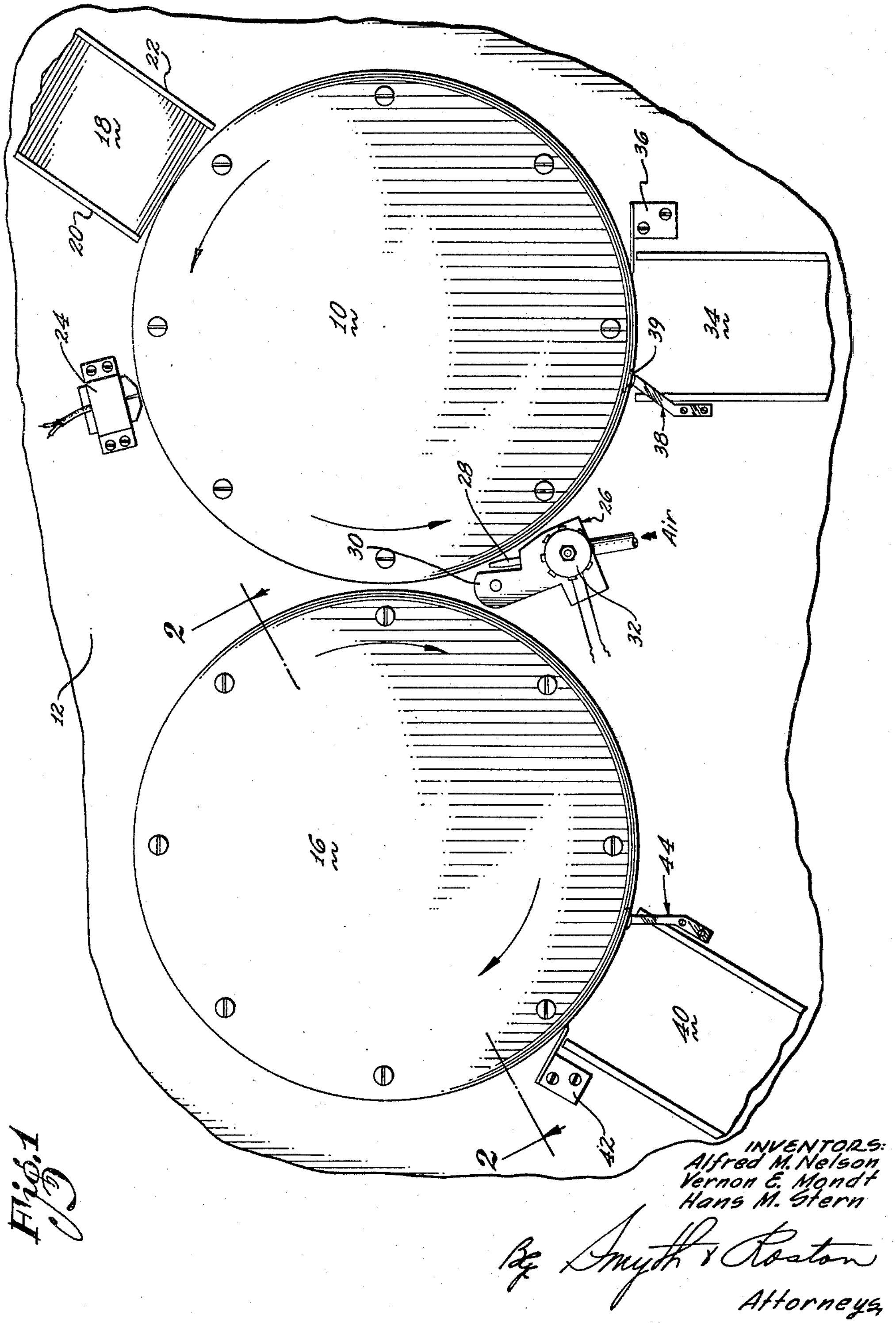
FIGURE 1 is a top plan view of a somewhat schematic representation of a relatively simple data processing system incorporating the present invention, the illustrated system including a pair of vacuum pressure rotatable transporting drums and a gate transfer mechanism for controlling the transfer of cards from one drum to the other.

The data processing system of FIGURE 1 includes a rotatable vacuum transporting drum 10 which is rotatably mounted on a table top 12. A second vacuum transporting drum 16 is also rotatably mounted on the table top 12 adjacent the drum 10. The drum 10 is controlled, for example, to rotate in a counter clockwise direction, and the drum 16 is controlled to rotate in a clockwise direction.

A feeding station 18 is mounted on the table top 12, and the mouth of this feeding station is disposed adjacent the periphery of the drum 10. The feeding station 18 includes a pair of parallel guide rails 20 and 22, and the station supports a plurality of information cards. The cards are supported in the station in generally vertical planes between the guide rails 20 and 22 and with the lower edges of the cards resting on the table top. The cards are disposed in essentially tangential arrangement with the periphery of the drum 10. A vacuum pressure is provided at the periphery of the drum 10, and upon rotation of the drum, these cards are drawn by the drum in a one by one sequence out of the feeding station 18. The end of the guide rail 20 is spaced from the periphery of the drum 10 by a distance which is just enough to allow only one card at a time to pass between it and the drum. This assures that the cards will be sequentially drawn by the drum out of the feeding station.

A transducer means 24 is mounted on the table top 12, and this transducer means is positioned to be in operative relationship with the periphery of the drum 10. The cards withdrawn by the drum from the feeding station 18 are transported in succession by the drum past the transducer means 24. The face of the transducer means is spaced radially from the drum a distance sufficient to allow the drum 10 to carry each card past the transducer means. The transducer means 24 may, for example, be a series of electro-magnetic transducers. In a manner to be described in detail, these transducers scan different rows of magnetic areas on the individual cards, and they serve to generate control pulses corresponding to the data recorded on such cards.

As clearly shown in FIGURE 1, the transducer means 24 is positioned between the feeding station 18 and the adjacent point between the drums 10 and 16. A gate transfer mechanism 26, which will be described in detail, is mounted on the table top 12 at the adjacent point of the drums 10 and 16. The gate transfer mechanism includes a series of nozzles 28 which direct fluid such as air, under pressure tangentially of the drum 10. The resulting streams of pressurized fluid strip from the drum 10 each card brought under their influence by that drum. The mechanism then causes such a card to be guided by a guide portion 30 from the drum 10 into the field of influence of the vacuum pressure that is developed at the periphery of the drum 16. Therefore, properly timed streams of air issuing from the nozzles 28 can cause selected ones of the cards to be transferred from the drum 10 to the drum 16. The gate transfer mechanism 26 is spaced radially from the drum 10 by an amount sufficient to permit cards to be transported in sequence by that drum past the gate transfer mechanism in the absence of pressurized fluid streams from the nozzles 28.

The gate transfer mechanism 26 includes a valve assembly 32 which may be constructed in accordance with the concepts of the invention. Pressurized fluid such as air is introduced to the valve assembly 32, and successive pulsing of a solenoid winding in the valve assembly causes the valve to introduce the pressurized air to the nozzles 28 in one stable operating condition of the valve, and to cut off the air from the nozzles in a second stable operating condition of the valve. It is evident, therefore, that selective control of the valve assembly 32 can cause selected cards to be transferred from the drum 10 to the drum 16, whereas the remaining cards are retained on the periphery of the drum 10.

The remaining cards referred to in the preceding paragraph are transported by the drum 10 to a stacking station 34. This stacking station is mounted on the table top 12, and it is positioned between the adjacent point of the drum and the feeding station 18. The stacking station 34 includes a stop member 36 which is secured to the table top 12. The stop member has fingers which extend into grooves of the periphery of the drum 10. The station also includes a stationary lifter 38. This lifter also has fingers 39 which engage the grooves in the periphery of the drum 10. These fingers each have an intermediate portion which is bulged outwardly from the drum.

Any card transported by the drum to the station 34 rides up over the fingers 39 of the stationary lifter member 38, and the leading edge of each such card rides up over the stop member 36 and is removed from the periphery of the drum 10. The trailing edge of the arrested card projects over the fingers of the lifter 38. The next succeeding card then passes under the arrested card on the lifter 38 and it too is arrested by the stop member 36. This causes the first card to be moved into the station 34. In this manner, the cards transported by the drum 10 past the gate transfer mechanism 26 may be deposited one after the other in the proper order in the stacking station 34.

A similar stacking station 40 is mounted on the table top 12 with its mouth adjacent the periphery of the drum 16. This latter stacking station has a stop member 42 and a lifter 44 associated with it. These members function in the same manner as the members 36 and 38 to deposit cards transported by the drum 16 in the stacking station 40.

In a manner to be described, and under the control of a relatively simple electronic system, the transducer means 24 develops control signals whenever a desired card is transported past it by the drum 10. These control signals activate the gate transfer mechanism 26 so that this particular card may be transferred to the drum 16 and deposited in the stacking station 40. All other cards transported by the drum 10 are deposited in the stacking station 34. In this manner, one or more desired cards may be selected from a group of cards in the feeding station 18, the selected cards being deposited in the stacking station 40 and all the other cards being deposited in the stacking station 34.

As noted above, the rotatable drum 16 may be similar in its construction to the vacuum transporting drum disclosed and claimed in copending application Serial No. 600,975, which was filed July 30, 1956 by Loren R. Wilson. Also, the drum 10 may be similar in its construction to the drum 16, and for that reason only the drum 16 is shown in detail in FIGURE 3. The details of the drum illustrated in FIGURE 2 are similar to the embodiment of the drum disclosed and claimed in copending application Serial No. 600,975.

Figure 2:
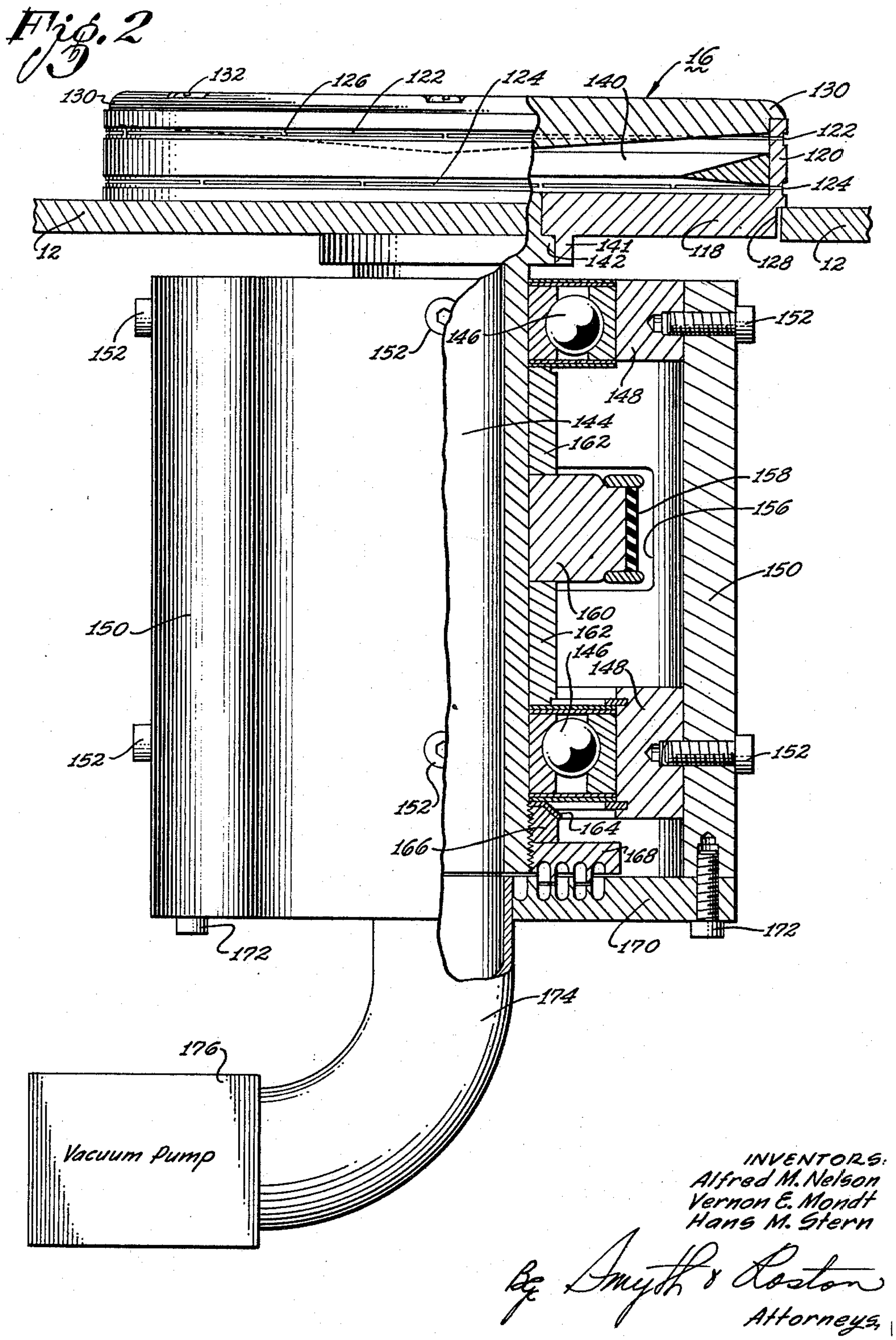
FIGURE 2 is a sectional view substantially on the line 2—2 of FIGURE 1 and showing the constructional details of one of the vacuum pressure transporting drums shown in FIGURE 1.

As shown in FIGURE 2, the drum 16 has a lower section and an upper section. The lower section of the drum includes a disc-like bottom portion 118 and an integral annular side portion 120. A pair of axially spaced peripheral orifices 122 and 124 extend through the side portion 120. Each of these orifices has an external groove associated with it for receiving the fingers of the stop members 36 and 42. The ends of the fingers of the lifters 38 and 44 also extend into these grooves as noted, so that the cards transported on the periphery of the drums may conveniently ride up and over these fingers. The peripheral orifices 122 and 124 are discontinuous in that they are interrupted at selected intervals by a series of ribs 126 which are integral with the side portion 120.

The disc-like bottom portion 118 of the lower section is undercut as shown at 128. This enables the table top 12 to extend beyond the outer limits of the side portion 120, so that the peripheral surface of that portion overlaps the table top in the illustrated manner.

The upper section of the drum 16 is in the form of a disc-like member 130 which engages the annular side member 120 of the lower section. The upper section 130 forms an enclosure with the lower section of the drum, with the upper section parallel to the disc-shaped bottom portion 118 of the lower section. The upper section 130 is held in place on the side portion 120 by a series of screws 132.

A deflector ring 140 is supported within the interior of the drum 16 in press fit with the inner surface of the annular side portion 120. This deflector ring is tapered toward the center of the drum to prevent turbulence and to provide a streamlined path for air that is drawn in through the orifices 122 and 124. The under surface of the upper section 130 is bulged toward the center of the section so as to have a convex shape. This convex shape also cooperates with the deflector ring 140 in providing a smooth path for air drawn in through the orifices 122 and 124.

The portion 118 of the lower section of the drum 16 has an annular sleeve 141 which extends downwardly from that portion. The sleeve 141 rests on a collar 142 provided at one end of a hollow shaft 144 and has a friction fit with the collar. Therefore, rotation of the hollow shaft 144 causes the drum 16 to rotate. Also, the interior of the shaft 144 communicates with the interior of the drum.

Bearings 146 are provided at opposite ends of the shaft 144. The inner races of the bearings 146 are mounted on the shaft 144, and the outer races of the bearings are disposed against bushings 148 secured to a housing 150 by a plurality of studs 152. An arcuate opening 156 is provided in the housing 150 between the bearings 146. This opening enables a drive belt 158 to extend into the housing and around a pulley 160. The pulley 160 is keyed to the shaft 144 between the bearings 146 and it is held against axial movement by sleeves 162 which are positioned on the shaft between the bearings and the pulley. In this manner, the shaft 144 and the drum 16 can be rotated by a suitable motor (not shown) coupled to the pulley 160 by the drive belt 158.

The bearings 146 and the sleeves 162 are held on the shaft 144 by a nut 166. The nut is screwed on a threaded portion at the bottom of the shaft and is maintained in fixed position on the shaft by a lock washer 164. A sealing disc 168 is also screwed on the threaded portion at the bottom of the shaft 144. The sealing disc 168 operates in conjunction with a bottom plate 170 to inhibit the movement of air between the interior of the housing 150 and the interior of the hollow shaft 144 when a difference of pressure exists between the housing and the interior of the shaft.

The bottom plate 170 is secured to the housing 150 by a series of studs 172 and is provided with a central opening. A hollow conduit 174 extends into the opening in friction fit with the plate 170. The conduit 174 is axially aligned with the hollow shaft 144 so that air may be exhausted from the hollow interiors of the shaft and conduit by a vacuum pump 176. The vacuum pump may be of any suitable known construction and for that reason is shown in block form in FIGURE 2.

The vacuum pump 176 draws air in through the orifices 122 and 124 and through the interior of the drum 16 down the shaft 144 and through the conduit 174. This creates a vacuum pressure at the outer peripheral surface of the annular portion 120 of the lower section of the drum 16. This provides a vacuum pressure around the outer peripheral surface of the annular side portion 120 of the drum 16 to firmly retain the cards from the feeding station 18 on that surface.

Figure 3:
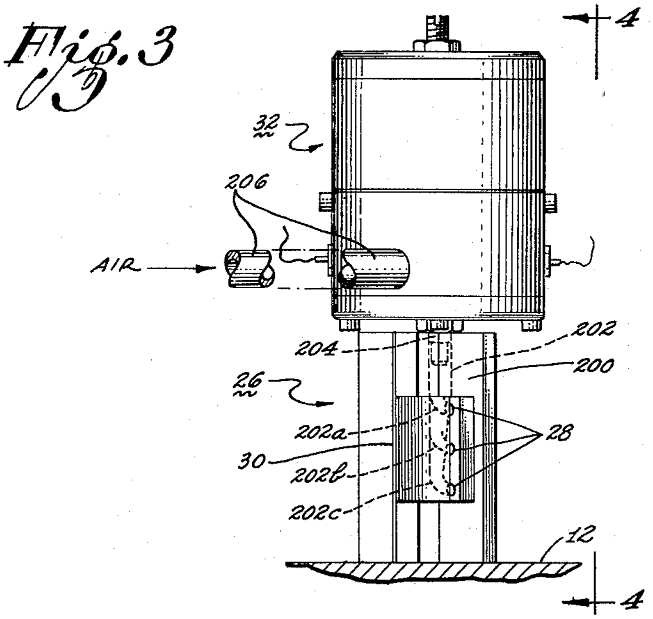
FIGURES 3 and 4 are enlarged elevational views taken from different angles of the gate transfer mechanism of FIGURE 1, the mechanism including a nozzle arrangement and an electro-magnetically actuated valve assembly, which assembly may be constructed in accordance with the concepts of the present invention.
Figure 4:
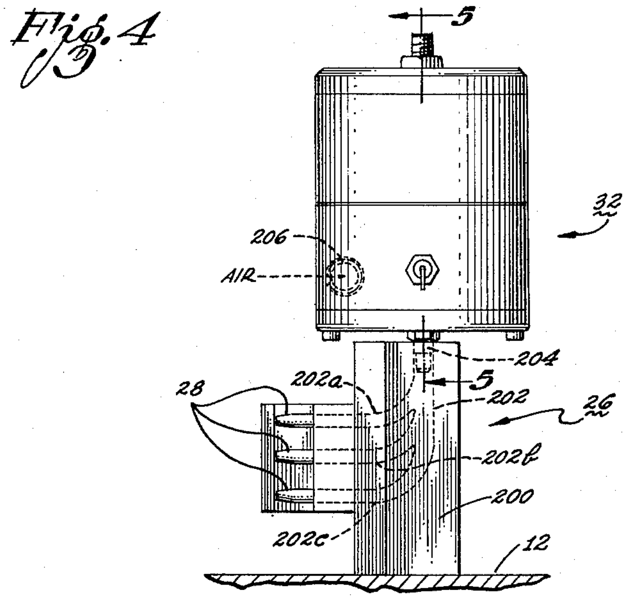

The valve and nozzle assembly 32 are more clearly shown in FIGURES 3 and 4. The valve assembly, for example, comprises a metallic block 200 which is integral with the guide portion 30 of the transfer mechanism. The electro-magnetically actuated valve 32 of the present invention is mounted on the top surface of the solid block 200. The block 200 has a channel 202 extending down through it from its top surface. This channel has three branches 202*a*, 202*b* and 202*c* which communicate with respective ones of the nozzles 28. As shown in FIGURES 3 and 4, and in FIGURE 1, the nozzles extend outwardly from the block 200 adjacent one side of the guide portion 30.

The valve assembly 32 has an exhaust port 204 which protrudes from its lower surface and which extends down into the channel 202. The valve also has an inlet 206 which is adapted to be coupled to an appropriate pressurized fluid source, such as an air pump. Therefore, fluid such as air is supplied under pressure to the inlet 206 of the valve 32. When the valve is opened, the air pressure is exhausted through the exhaust port 204 into the channel 202. The air then emerges as pressurized streams from the nozzle 28 to effectuate the transfer of cards as described above. The actuation of the valve 32 and its mechanical details may be best appreciated by a consideration of FIGURES 5 and 6.

The valve assembly 32 includes a cylindrical shaped permanent magnet member 210 which is composed, for example, of "Alnico V." The permanent magnet member 210 is longitudinally magnetized. A first disc-shaped pole piece 212 is secured to one end of the permanent magnet 210, and this pole piece has an elongated integral center portion 212*a*. The center portion 212*a* extends through the permanent magnet 210 in coaxial relation with the permanent magnet, and this portion protrudes through the opposite end of the permanent magnet from the pole piece 212. The pole piece 212 and its central portion 212*a* may be composed, for example, of soft steel.

A second disc-shaped pole piece 214 is mounted against the other end of the cylindrical permanent magnet 210, and this latter pole piece may also be composed of soft steel. The pole piece 214 has a central aperture through which the portion 212*a* of the pole piece 212 extends. The portion 212*a* and the pole piece 214 define an annular air gap 216 in which magnetic flux is produced.

The pole pieces 212 and 214 are held firmly against the opposite ends of the cylindrical permanent magnet 210 by means of a series of screws such as the screw 218. These screws may be composed, for example, of a non-magnetic material such as brass and they extend longitudinally through the permanent magnet 210 from one of the pole pieces to the other.

The outer surface of the pole piece 214 has an annular channel formed near the periphery of this pole piece. A metallic ring-like member 220 composed of a non-magnetic substance, such as brass, is mounted in the annular channel. The member 220 is firmly secured to the pole piece 214 as by brazing. The member 220 has a peripheral channel formed in its rim, and this latter channel serves to support a resilient O-ring seal 222. This O-ring serves as an air tight seal for the valve assembly, as will be described.

Figures 5, 6:
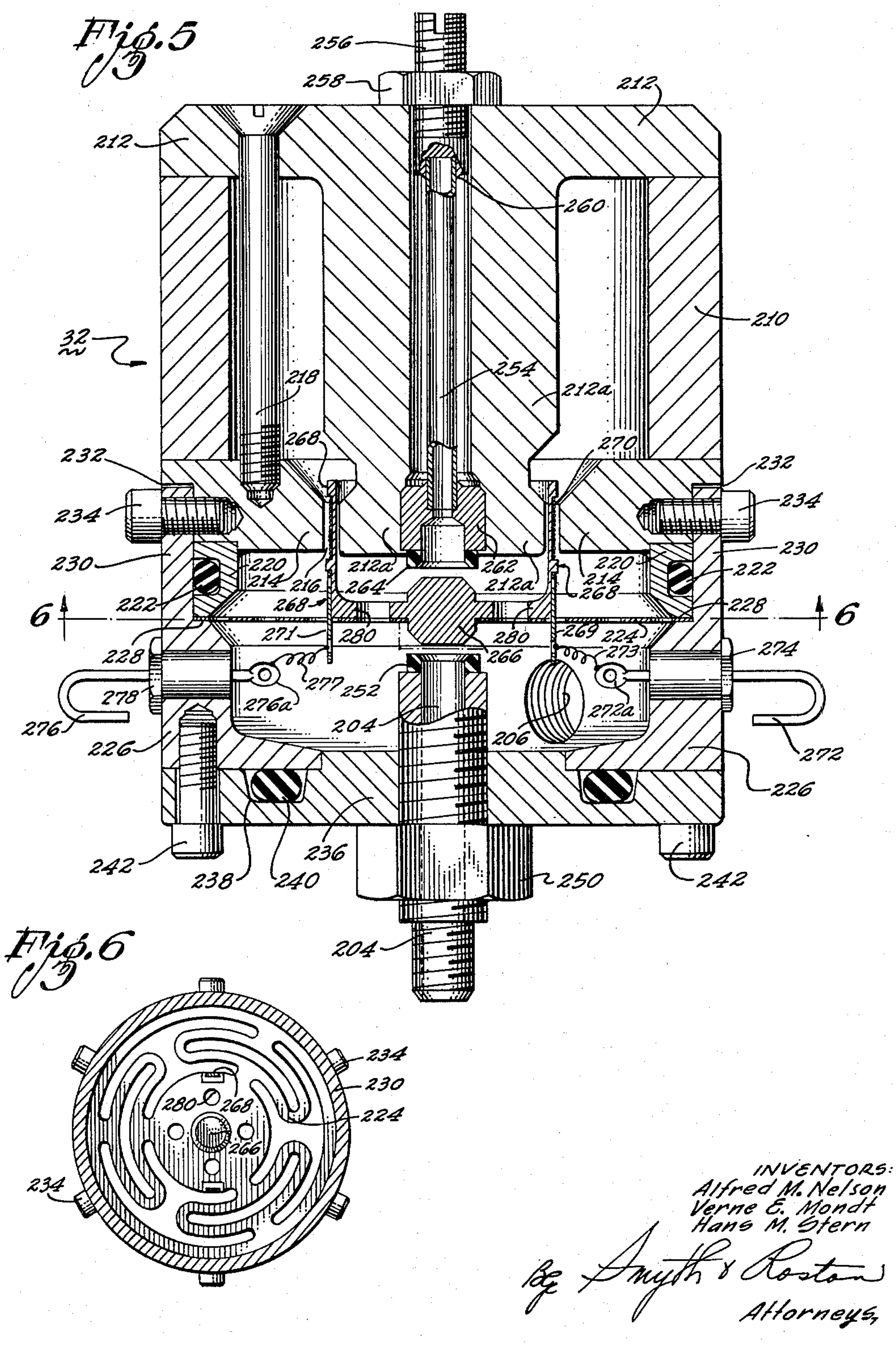
FIGURE 5 is a sectional view of the valve portion of the gate transfer mechanism of FIGURES 3 and 4 and is taken substantially on the line 5—5 of FIGURE 4 to illustrate several components of the valve including a resilient spider for centering a valve closure member and a magnetic control to cause the closure member to seat with an exhaust port of the valve at a relatively high rate of speed.
FIGURE 6 is a sectional view on a reduced scale of the valve of FIGURE 5 and is taken substantially on the line 6—6 of FIGURE 5, this latter view showing in particular the details of the resilient spider of FIGURE 5.

A disc-like resilient spider 224 is adapted to be mounted on the ring-like member 220 to extend across the area circumscribed by that member. The spider 224 may be composed, for example, of phosphor bronze. This spider is cut out to have a somewhat peculiar configuration, as best shown in FIGURE 6. This cut out configuration permits relatively unimpeded longitudinal motion of the center of the spider and yet prevents any radial motion of any portion of the diaphragm.

A cylindrical valve housing 226 composed, for example, of a non-magnetic material, such as aluminum, is adapted to enclose the resilient spider 224. This housing has a shoulder portion 228 which engages the annular edge of the outer surface of the ring-like member 220 to sandwich the resilient spider 224 between the shoulder portion and the ring-like member. The spider is firmly held in position by the shoulder portion 228 and by the ringlike member 220. The housing 226 has an integral skirt portion 230 which extends over the rim of the ring-like member 220 and into a counter-sunk peripheral portion 232 of the pole piece 214.

The valve housing is firmly held in place by means of a series of screws 234 which extends radially through the skirt portion 230 of the aluminum housing 226 and are threaded into the soft steel pole piece 214. The O-ring seal 222 is compressed betweed the skirt 230 and the rim of the ring-like member 220 to form an air tight seal.

The housing has a disc-like cover portion 236 which also may be composed of aluminum. The cover has an annular channel 238 formed in its inner surface. A resilient O-ring seal 240 is placed in the channel 238. The cover is held in place by a series of screws such as the screws 242. These screws extend axially through the cover and are threaded into the housing 226. When the screws are tightened, the O-ring 240 is compressed to form a fluid tight seal between the cover 236 and the housing 226.

The inlet 206 referred to previously in conjunction with FIGURES 3 and 4, is formed in the housing 226, this inlet extends radially through the housing. The cover 236 has a central aperture, and the exhaust port 204 extends through that aperture in coaxial relation with the permanent magnet 210. The exhaust port is tubular in form and it may be composed of a non-magnetic material such as brass. The exhaust port is mounted on the cover 236 by means, for example, of a nut 250. This permits the axial position of the tubular exhaust port in the housing to be adjusted. A resilient valve seat 252 composed, for example, of rubber, is formed on the inner end of the tubular exhaust port 204.

A second tubular exhaust port 254 extends through a central aperture in the elongated portion 212*a* of the pole piece 212. The tubular exhaust port 254 is axially aligned with the exhaust port 204, and it has an end portion 256 extending through the pole piece 212. This end portion is attached to the pole piece 212 by means of a nut 258. This nut may be loosened to permit the exhaust port 254 to be adjusted axially in the portion 212*a* of the pole piece 212. The tubular exhaust port 254 extends into the end portion 256, and the port is secured to the end portion by means, for example, of a solder joint 260.

The exhaust port 254 and the end portion 256 may be composed of non-magnetic material, such as brass, as may the exhaust port 204. The inner end of the exhaust port 254 termitates in an apertured block 262 which is threaded in a recess in the end of the pole piece portion 212*a*. The block 262 may also be composed of a non-magnetic material such as brass. A second resilient rubber valve seat 264 is formed in the recess in the block 262 at the end of the block near the spider 224. The recess in the block 262 communicates with the hollow interior of the exhaust port 254. The valve seats 252 and 264 are axially aligned with one another on opposite sides of the spider 224, and these valve seats are each spaced a predetermined distance from the spider.

A valve closure member 266 in the form of a two-sided poppet valve is precisely centered within the housing by the spider 224. When the closure member is moved downwardly in FIGURE 5, one side of the closure member 266 closes with the valve seat 252 in a fluid tight seal. Also, when the closure member is moved upwardly in FIGURE 5, the other side of the closure member closes with the valve seat 264 to form a fluid tight seal.

A cylindrical coil form 268 is secured to the closure member 266, and the coil form is accurately centered by the spider 224 in coaxial relation with the permanent magnet 210, to extend into the annular air gap 216. The coil form 268 is so dimensioned and so centered that it extends into the annular air gap in spaced relationship with both the pole piece 214 and in spaced relationship with the portion 212*a* of the pole piece 212.

A portion of the peripheral surface of the coil form 268 is recessed, and an electric winding 270 is wound about the coil form 268 in the recessed portion. The ends of this winding are connected respectively to a pair of electric terminals 269 and 271 on the coil form. A first electric terminal 272 is mounted on the housing 226 in sealed relation with the housing by means including a nut 274. This terminal has an eyelet portion 272a at its inner end within the valve housing. A wire lead 273 from the terminal 269 is soldered or otherwise electrically connected to the eyelet 272a. A second electric terminal 276 is mounted in sealed relation to the housing 226 by means including a nut 278. The second terminal has an eyelet portion 276a at its inner end within the housing. A wire 277 lead from the terminal 271 is soldered or otherwise connected to the eyelet 276a.

In one position of the valve, the closure member 266 is positioned against the seat 252 to prevent fluid from flowing through the port 204. In this position of the valve, the fluid is able to flow through the inlet 206, the housing 226, the openings 280 and the port 254 so as to be bypassed from the port 204. The pressure of the fluid introduced into the housing acts against the closure member 266 to maintain the member against the valve seat 252.

Because of the inclusion of the permanent magnet 210, flux is induced in a magnetic path including the permanent magnet and the pole pieces 212 and 214. This flux causes a pole face to be produced in the pole piece 214 at a position contiguous to the coil form 268. The polarity of the pole face is dependent upon the orientation with which the permanent magnet 210 is positioned in the magnetic circuit. For purposes of subsequent discussion, a pole face having a north polarity will be considered as being produced in the pole piece 214 at a position adjacent to the coil form 268, and a pole face having a south polarity will be produced in the pole piece 212a. Therefore, radial lines of flux will cross the annular air gap from the pole piece 212a to the pole piece 214.

At certain times, voltage pulses may be introduced to the winding 270 on the coil form 268. These voltage pulses produce a current through the winding, and this current produces a magnetic flux around the individual turns of the winding, as is well known. As is equally well known, this latter flux reacts with the radial flux in the annular air gap 216 to cause the winding 270 and the coil form 268 to move up into the air gap, or to cause these elements to move down out of the air gap.

Therefore, when control pulses of a first polarity are introduced to the winding 270, the resulting current flow in this winding causes the coil form 268 to move down in FIGURE 5 to seat the closure member 266 against the valve seat 252. Alternately, when control pulses of the opposite polarity are introduced to the winding 270, the coil form 268 is caused to move up into the air gap 216 so as to seat the closure member 266 against the valve seat 264. These control pulses may be supplied to the winding 270 by introducing voltage pulses across the terminals 276 and 272 of the assembly. These terminals are connected to the winding, as described above, through the terminal connections 276a, 271, 272a, 269 and the connecting leads 273 and 277.

When a voltage pulse introduced across the terminals 272 and 276 causes a current pulse to flow in the winding in a direction to cause the coil form 268 to move down in FIGURE 5 to seat the closure member 266 against the valve seat 252, the fluid pressure in the housing due to the pressure of the fluid introduced through the inlet port 206 creates a pressure differential between the inner side of the closure member 266 and the side which seats with the valve seat 252. The resulting force securely holds the closure member against the seat 252 in the position to which it was triggered and after the termination of the triggering current pulse in the winding 270. Likewise, the subsequent introduction of an opposite polarity current pulse in the winding, moves the coil form 268 up into the air gap 216 to release the closure member 266 from the valve seat 252 and to seat it against the valve seat 264. A like pressure differential is now created between one side of the closure member and the other to create a force holding the closure member 266 firmly against the valve seat 264 after this latter triggering pulse has been terminated.

The dimensions of the ports 204 and 254 are such that an internal pressure can be maintained in the valve housing by the fluid introduced to the valve through the inlet port 206. That is, there is not a complete loss in fluid pressure through the port 204 or 254 that happens to be open at any particular time.

The apparatus constituting the high speed bi-stable valve included in this invention has certain advantages. One advantage results from the fact that no springs are included in the apparatus to hold the closure member 266 in either of its closed positions. Since such springs generally slow down the speed of response, the elimination of springs results in a valve which is extremely rapid in response.

The speed of response of the unit is facilitated by a snap action which is produced as the closure member 266 moves toward either one of the valve ports 204 and 254. For example, as the closure member 266 approaches the valve port 204, the velocity of the fluid flowing through the valve port tends to increase with a corresponding decrease in pressure with respect to the pressure of the fluid in the housing 226. This causes the fluid in the housing 226 to exert a force for bringing the closure member against the seat 252. This force acts to aid the force produced by the flow of current through the winding 270.

The apparatus constituting this invention also has other advantages. These advantages result in part from the fact that the valve is able to remain in an open position or a closed position even after the interruption of a current pulse through the winding 270. The valve is able to maintain this operating condition because of its inherent nature. The pressure of the fluid flowing through the housing causes a considerable force to be exerted against the closure member 266. This force is sufficient to maintain the closure member against either the valve seat 252 or the valve seat 264 even after the interruption of any current flow in the winding 270.

The valve of the invention may be made extremely stable in its operation by removing the drive pulse before the closure member 266 strikes the valve seat to which it is being actuated. This allows the closure member to "coast" into its seated position and militates against any tendency for the closure member to "bounce." The resilient rubber valve seats absorb most of the energy of motion of the closure member to assist in establishing stability in the operation of the valve. Then, the pressure differential which exists between the interior of the housing and the port against which the closure member is seated, creates a sufficient force against the closure member firmly to retain the closure member in its seated position against either the valve seat 264 or 252 after the termination of the actuating current pulse through the winding 270.

Since the closure member 266 remains in the proper position even after the interruption of any current flow through the winding 270, voltage pulses of relatively short duration can be introduced across the terminals 272 and 276 to control the operation of the valve in its two positions. The use of such pulses is desirable since this is the form of signals which are produced in certain parts such as data processing apparatus. The use of such pulses is also desirable in facilitating a high speed at which the valve is able to respond and to change from one condition to another. Also, there is no burn-out problem of the winding 270 since the valve can be maintained in either of its conditions without the need for a continual flow of current through that winding.

The apertures of the exhaust ports 204 and 254 are made such that these ports present a restricted passage to the fluid passing through them. This restriction in each port is such that there is sufficient pressure within the valve housing to hold the valve in one or the other of its stable operating conditions despite the loss of pressure due to the passage of the fluid through the open one of the exhaust ports.

The exhaust port 254 may be of smaller dimensions than the exhaust port 204, as illustrated, and the exhaust port 254 may function merely as a bleeder to the atmosphere. However, when so desired, the bi-stable valve may be made double acting and both the exhaust ports 204 and 254 put to use. For example, fluid flowing through the port 204 may be introduced to the gate transfer mechanism 26 to obtain the transfer of cards from the drum 10 to the drum 16. Similarly, fluid flowing through the port 254 may be introduced to a gate transfer mechanism corresponding to the mechanism 26 to obtain a transfer of cards from the drum 16 to the drum 10 or a transfer between any other pair of drums included in a card processing system. As noted, the nuts 250 and 258 allow the individual axial positions of the exhaust ports to be adjusted.

The solenoid winding 270, may, for example, have a direct current resistance of 1 ohm, and a sufficient actuating current for the switch may be derived by the introduction of ±3 volts across the winding. As noted above, a constructed embodiment of the valve has been operated with up to 150 operations per second. This operation was obtained under the control of current pulses having an individual duration of one millisecond; and to provide full flow of air from a nozzle within two milliseconds after the application of a control pulse.

Figures 7, 8:
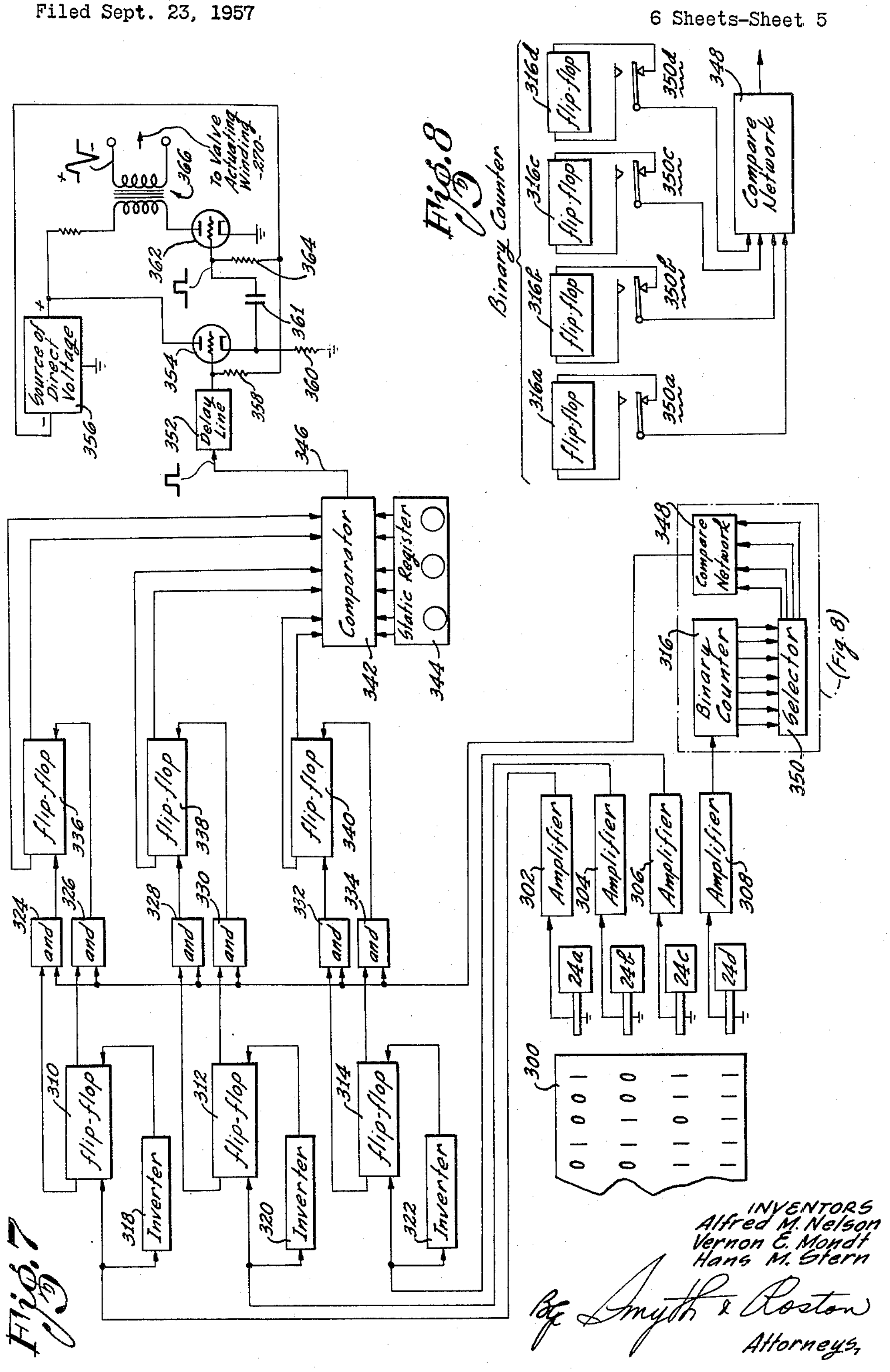
FIGURE 7 is a block representation of a suitable electronic control system in conjunction with the apparatus shown in FIGURE 1 to control the processing of information cards.
FIGURE 8 is a block diagram of a binary counter and selector arrangement utilized in the control system of FIGURE 7.

The control system of FIGURE 7 includes a group of transducer heads **24*a*, 24*b*, 24*c* and 24*d* positioned adjacent the drum 10 in a manner similar to the transducer means 24 in FIGURE 1. The heads 24*a*, 24*b*, 24*c* and 24*d* are adapted to perform the functions of the transducer means 24, and these heads scan the information cards, such as the cards 300, which are transported past them on the drum 10. The heads 24*a*, 24*b*, 24*c* and 24*d*** may be positioned in a linear relationship. Preferably, howeverfi the heads are disposed in a staggered relationship to minimize cross talk between the heads and to facilitate proper disposition of the heads by increasing the space between the heads. When the heads are staggered, each column on a card does not have a linear relationship for the information in the different rows but has a relationship corresponding to the staggering of the heads.

As previously noted, the information cards such as the card 300 may contain desired data or information, and this data is preferably recorded on the cards in the form of small areas or dots of one magnetic polarity or the other. These dots are arranged in a series of horizontal rows along the cards, with the rows placed one under the other so as to form vertical columns across each card. Each of these vertical columns corresponds to a position of the card. The bottom row of data contains the magnetic dots of one polarity only so as to provide clock signals for the system.

In the illustrated system, three rows of data and a row of clock signals are shown. It is evident that more or less rows may be used, depending on the amount of information desired. Each of the transducer heads **24*a*, 24*b*, 24*c* is positioned to scan a different row of data on each of the information cards, such as the card 300. Since the number of heads may correspond to the number of rows of data, three heads are shown only by way of example. The transducer head 24*d* scans the bottom row to produce clock signals. The transducer heads 24*a*, 24*b*, 24*c* and 24*d* are connected respectively to the input terminals of a series of amplifiers 302, 304, 306 and 308. The output terminals of the amplifiers, 302, 304 and 306 are connected to the left input terminals of a series of flip-flops 310, 312 and 314**.

The units illustrated by the blocks entitled flip-flops in FIGURE 7 are well known bi-stable relaxation circuits. Each of these units may be triggered to what is termed a "false" state by the application of a positive pulse to its right input terminal. The trailing edge of such a pulse causes the unit to assume its "false" state in which a relatively high voltage is exhibited at its right output terminal and a relatively low voltage is exhibited at its left output terminal. On the other hand, the flip-flop may be triggered to what shall be termed a "true" state by the introduction of a positive pulse to its left input terminal. The trailing edge of such a pulse triggers the flip-flop and causes a relatively high voltage to be exhibited at its left output terminal and a relatively low voltage to be exhibited at its right output terminal.

The flip-flops may be constructed in a manner similar to that described on pages 164 to 166, inclusive, of volume 19 entitled "Wave Forms" of the Radiation Laboratory series published in 1949 by the Massachusetts Institute of Technology.

Units illustrated by the rectangular blocks in FIGURE 7 and, which will be subsequently referred to as "and" networks are also believed to be sufficiently well known to the art as to preclude the necessity of a detailed showing of such units. These units have the property of passing a signal to their individual output terminals only in the presence of all the input intended to be introduced to their respective input terminals. "And" networks, for example, are described on page 32 of "Arithmetic Operations in Digital Computers" by R. K. Richards (published by D. Van Nostrand Inc. in 1955).

Other components of the control system, such as delay lines, binary counters, inverters and the like, are believed to be sufficiently well known to the electronic art so that a detailed description of the circuits making up these units is also deemed to be unnecessary.

The output terminal of the amplifier 308 is connected to a binary counter 316. The output terminals of the amplifiers 302, 304 and 306 are also respectively connected to a series of inverters 318, 320 and 322. The output terminals of the inverters are connected to the respective right input terminals of the flip-flops 310, 312 and 314.

The left and right output terminals of the flip-flop 310 are connected respectively to a pair of "and" networks 324 and 326. The left and right output terminals of the flip-flop 312 are similarly connected to a pair of "and" networks 328 and 330. Also, the left and right output terminals of the flip-flop 314 are connected respectively to an "and" network 332 and to an "and" network 334.

The "and" network 324 is connected to the left input terminal of a flip-flop 336, and the "and" network 326 is connected to the right input terminal of that flip-flop. In similar manner, the "and" network 328 is connected to the left input terminal of a flip-flop 338, whereas the "and" network 330 is connected to the right input terminal of that flip-flop. Similarly, the "and" network 332 is connected to the left input terminal of a flip-flop 340, and the "and" network 334 is connected to the right input terminal of the latter flip-flop.

The output terminals of the flip-flops 336, 338 and 340 are all connected to a comparator 342. A static register 344 is also connected to the comparator. The comparator 342 is shown in block form for purposes of simplicity, as is the static register 344. Actually, the comparator is formed from a plurality of "and" and "or" networks, and operated in a manner similar to that disclosed in Edwards Patent 2,615,127 and Woolard Patent 2,641,696.

The static register 344 may be any known type of manually operated instrument, such as a patch board, which is capable of producing any desired pattern of voltages across its output terminals. The comparator 342 functions to compare the pattern of voltages from the static register with the pattern indicated by the flip-flops 336, 338 and 340 to develop an output pulse on a lead 346 connected to its output terminal when the two patterns represent, for example, the same binary number.

The binary counter 316 is connected to a selector 350 to introduce signals to the selector. The output from the selector is introduced to the input terminals of a compare network 348 as will be described in detail subsequently in connection with the embodiment shown in FIGURE 8. The purpose of the selector 350 is to insure that only the information on a selected column of each card will be used to control the operation of the bi-stable valve forming a part of this invention. The output terminal of the compare network 348 is connected to each of the "and" networks 324, 326, 328, 330, 332 and 334. The combination of the binary counter 316, the selector 350 and the compare network 348 will be described subsequently with respect to FIGURE 8. The selector 350 may be adjusted manually so that the compare network 348 passes an output pulse to the "and" networks 324, 326, 328, 330, 332, and 334 at a selected count on the binary counter 316 corresponding to a selected column of data on each of the cards such as the card 300.

The binary counter 316, as shown in FIGURE 8, may be formed from a plurality of flip-flops 316*a*, 316*b*, 316*c* and 316*d*. The selector 350 may comprise a plurality of single-pole double-throw switches 350*a*, 350*b*, 350*c* and 350*d*. The fixed contacts of these switches are connected in each instance to the left and right output terminals of a corresponding one of the flip-flops 316*a*, 316*b*, 316*c* and 316*d*, and the armatures of the switches are all connected to the compare network 348. The flip-flops themselves are connected in known manner (not shown) to constitute a usual binary counter.

As will be seen from FIGURE 8, for any particular setting of the armatures of the switches 350*a*, 350*b*, 350*c* and 350*d*, the armatures will all exhibit a relatively high voltage only when the flip-flops 316*a*, 316*b*, 316*c* and 316*d* have a particular pattern of operational states. For example, with the disclosed setting of the switches 350*a*, 350*b*, 350*c* and 350*d*, relatively high voltage appears on the armature of the switch 350*a*, only when the flip-flop 316*a* is in its "true" state. Likewise, relatively high voltages appear on the armatures of the switches 350*b* and 350*d* only when the flip-flops 316*b* and 316*d* are in their "true" states, and a relatively high voltage appears on the armature of the switch 350*c* only when the flip-flop 316*c* is in a "false" state. The flip-flops have such particular states in the illustrated embodiment, for the compare network 348 to pass a signal to its output lead. The compare network 348 may be a usual type of "and" network in this embodiment. In this way, the selector formed by the switches 350*a*, 350*b*, 350*c* and 350*d* in FIGURE 9 operates to provide for the passage of information from only a selected column on the card dependent upon the setting of the switches. By including the selector formed by the switches 350*a*, 350*b*, 350*c* and 350*d*, any particular column on the card can be used to control the operation of the bistable valve included in this invention.

The flip-flops 316*a*, 316*b*, 316*c* and 316*d*, as mentioned above, may be connected in known manner to constitute the binary counter 316. The binary counter is successively triggered by the clock signals from the amplifier 308 as each card is processed by the heads 24*a*, 24*b* and 24*c* and the counter is triggered once for each position of each card. The switches 350*a*, 350*b*, 350*c* and 350*d* may be set to a particular desired pattern corresponding to a particular count to be established by the binary counter. This count corresponds to the column of each card which is to be read as the cards are processed by the heads. Although four flip-flops are shown in the binary counter, more or less can be used depending upon the number of columns of each card.

The lead 346 is connected to a delay line 352 which, in turn, is connected to the control grid of a triode 354. The triode 354 is connected as a cathode follower. The anode of this triode is connected to the positive terminal of a source of direct voltage 356. A resistor 358 is connected between the control grid of the triode 354 and the negative terminal of the source 356. A resistor 360 has one terminal connected to the cathode of the triode 354, and the other terminal of this resistor is grounded. A coupling capacitor 361 is connected to the cathode of the triode 354 and to the control grid of a triode 362. The cathode of the triode 362 is grounded, and a resistor 364 is connected between its control grid and the negative terminal of the source 356. The anode of the triode 362 is connected to one terminal of the primary winding of a transformer 366. The other terminal of this primary winding is connected to a resistor 368, and the resistor 368 is connected to the positive terminal of this source 356. The secondary winding of the transformer 366 is connected to the terminals 276 and 272 of the valve 32, which valve was described in detail above.

To operate the particular system shown in FIGURE 1, a group of cards such as the card 300 are placed in stacked relationship in the feeding station 18. Assuming that it is desired to select certain cards from that group which have data corresponding to a certain binary number, at a selected column on the card, the static register 344 of the control system of FIGURE 7 is set to produce a pattern of voltages corresponding to that number, and the selector 350 is set to the desired column of each card.

Then, the system of FIGURE 1 is set in motion as set forth in co-pending application Serial No. 566,404 and the cards are successively withdrawn from the feeding station 18 by the drum 10. The cards are then carried in sequence by the drum 10 past the transducer means 24 which corresponds to the transducer heads 24*a*, 24*b*, 24*c* and 24*d* in FIGURE 7. Now, as the cards are continuously and successively fed from the feeding station 18 to the periphery of the drum 10, and as these cards are transported in succession past the heads 24*a*, 24*b*, 24*c* and 24*d*, each card is scanned by these heads and the flip-flops 310, 312 and 314 are triggered into operating positions corresponding to the data represented by succeeding columns on each card. The inverters 318, 320 and 322 assure that the flip-flops 310, 312 and 314 will be triggered at each column of each card into states representing the binary number recorded at such column. However, the triggering of the flip-flops 310, 312 and 314 is ineffective insofar as the rest of the system is concerned except at the selected column of each card, as established by the selector 350. This is because a pulse is passed by the compare network 348 from the binary counter 316 only for the selected column of each card. The pulse passed by the compare network 348 activates the "and" networks 324, 326, 328, 330, 332 and 334. This causes these "and" networks to pass information from the flip-flops 310, 312 and 314 to the flip-flops 336, 338 and 340 only at the selected column on the card.

The flip-flops 336, 338 and 340 are controlled, therefore, to assume individual operating conditions corresponding to the binary number represented by the column of data on each card selected by the selector 350. The operational states of these flip-flops are sensed by the comparator 342. However, the comparator produces an output pulse only when the data sensed by it corresponds to the binary number previously set in the static register 344. When this occurs, it means that one of the desired cards has been reached, and a positive pulse appears on the lead 346 to indicate that condition.

The pulse on the lead 346 is delayed by the delay line 352 for a time sufficient to enable the desired card to travel on the drum 10 in FIGURE 1 from the transducer means 24 to the gate transfer mechanism 26. After such a delay, the pulse is introduced to the control grid of the triode 354. This triode is normally biased to a non-conductive state by the negative bias supplied to its control grid. The introduction of the positive pulse from the delay line 352, however, causes the triode to become conductive and a corresponding positive pulse is developed across its cathode resistor 360. This latter pulse is introduced to the control grid of the triode 362. The triode 362 is also normally biased to a non-conductive state. However, when the pulse from the triode 354 is introduced to the control grid of the triode 362, the triode 362 becomes conductive and a current flows through the primary winding of the transformer 366.

The flow of current through the primary winding of the transformer 366 occurs for a relatively short time corresponding to the duration of the positive pulse applied to the control grid of the triode 362. The leading edge of the current pulse through the primary winding of the transformer 366 produces a positive voltage across the secondary winding of the transformer, and the trailing edge of the current pulse produces a negative pulse across the secondary winding. This is in accordance with well known transformer differentiating action.

The positive pulse across the secondary winding of the transformer 366 produces a current flow in the solenoid winding 270 of the valve assembly of FIGURE 5. It may be assumed that the valve has been previously triggered to a first stable state with the valve closure member 266 seated against the valve seat 252. However, the current pulse due to the positive voltage across the secondary of the transformer 366 causes the valve closure member 266 to be moved toward the valve seat 264, the closure member then being snapped against the valve seat 264 by fluid pressure in the valve, in the manner described previously. This new state of the valve allows the fluid pressure in the valve housing to be exhausted through the tubular port 204 and through the nozzles 28. The resulting pressurized streams of fluid from the nozzles cause the desired card to be transformed from the drum 10 to the drum 16, in the described manner, and to be deposited in the stacking station 40.

After the desired card has been transferred from the drum 10 to the drum 16, the negative voltage pulse across the secondary winding of the transformer 366, corresponding to the trailing edge of the current pulse in the primary winding, produces a current flow in the opposite direction through the solenoid winding 217. This causes the closure member 266 to be snapped back against the valve seat 252, so that the valve is returned to its original stable operating condition.

In the manner described, certain desired cards are transferred by the gate transfer mechanism 26 from the drum 10 to the drum 16, so that such cards may be deposited in the stacking station 40. The remaining cards are transported by the drum 10 past the gate transfer mechanism 26, and these remaining cards are deposited in the stacking station 34. This enables one or more desired cards to be quickly and efficiently selected from a large stack of information cards.

It will be noted that the valve 32 is controlled by a pulse which is effectively differentiated by the transformer 366. This efficient and desirable control of the valve permits pulses of relatively short duration to be used. The valve, as described above, does not require a sustained current, but is merely triggered between two stable operating conditions by opposite polarity pulses of relatively short duration.

Figure 9:
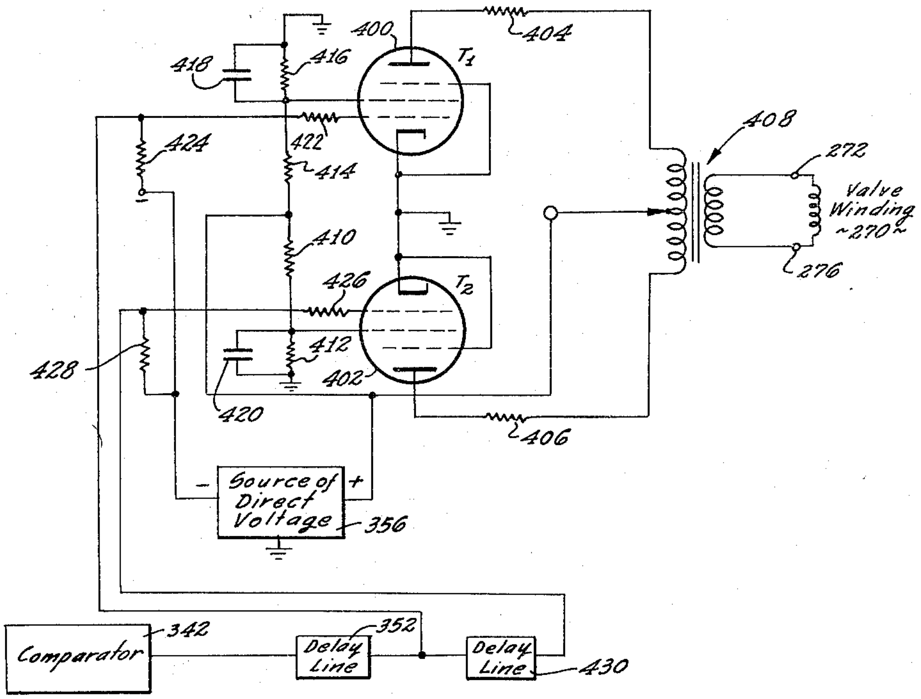
FIGURE 9 is a circuit diagram of a push-pull driver stage for the valve assembly of the invention which may be incorporated as a modification into the control system of FIGURE 7.

The control system of FIGURE 7 shows a particular type of drive for the valve which includes the triode 362 and the transformer 366 connected in the described manner. A push-pull drive circuit for the valve is shown in FIGURE 9. This latter circuit may be substituted for the drive shown in FIGURE 7.

The drive circuit of FIGURE 9 includes a first pentode 400 and a second pentode 402. The cathodes of these pentodes are grounded, and their anodes are respectively connected to a pair of resistors 404 and 406. These resistors 404 and 406 are connected to the respective terminals of the primary winding of an output transformer 408. This primary winding has a center tap which is connected to the positive terminal of the source of direct voltage 356.

A first pair of resistors 410 and 412 are connected in series between the positive terminal of the source 356 and ground. A second pair of resistors 414 and 416 are also connected in series between this positive terminal and ground. Each of these pairs of resistors is connected to constitute a voltage divider. The screen grid of the pentode 400 is connected to the junction of the resistors 414 and 416, and the screen grid of the pentode 402 is connected to the junction of the resistors 410 and 412. A screen grid by-passing capacitor 418 is shunted across the resistor 416, and a screen grid by-passing capacitor 420 is shunted across the resistor 412.

The control grid of the pentode 400 is connected to one side of a limiting resistor 422, the other side of this resistor being connected to a resistor 424. The resistor 424 in turn, is connected to the negative terminal of the source 356. Likewise, the control grid of the pentode 402 is connected to a resistor 426, and this resistor is connected in series with a resistor 428 to the negative terminal of the source 356.

The comparator 342, as before, is connected to the delay line 352, and the output terminal of the delay line is connected to the common junction of the resistors 422 and 424. The output terminal of the delay line 352 is connected to a second delay line 430, and this second delay line is connected to the common junction of the resistors 426 and 428.

As in the case of the control system of FIGURE 7, the comparator 342 develops an output pulse in response to a card that is to be transferred by the gate transfer mechanism incorporating the valve assembly of the invention. The circuit of the pentodes 400 and 402 is a conventional push-pull circuit which is normally balanced so that no voltage is developed across the secondary winding of the transformer 408. The pulse from the comparator 342 is delayed in the delay line 352 as before, for a time sufficient to permit a card which is to be transferred to reach the gate transfer mechanism. Then the delay line 352 develops an output pulse which causes the pentode 400 to pass an unbalancing current through the upper half of the primary winding of the transformer 408. The primary current is now in a direction to produce a voltage pulse of a particular polarity across the secondary winding of the transformer 408. This polarity is such, for example, to produce a current flow in the winding 270 in a direction to cause the coil form 268 in FIGURE 5 to move up into the air gap 216. This causes the valve closure member 266, which is supported on the coil form, to move from the valve seat 252 to the valve seat 264. Therefore, pressurized fluid introduced through the inlet port 206 passes through the valve and out the port 204 to effect the transfer of the card. As described above, the valve remains in this condition even after the termination of the pulse from the delay line 352.

After a selected time delay, as established by the delay line 430, the pentode 402 becomes conductive. This causes a current flow in the lower part of the primary winding of the transformer 408. The latter current flow is in the opposite direction to that caused by the pentode 400. Therefore, the secondary winding of the transformer 408 develops an output pulse of opposite polarity to the pulse produced previously. This causes a reverse current flow through the winding 270 on the coil form 268 in FIGURE 5. The coil form then moves down out of the air gap 216 to cause the closure member 266 to seat against the valve seat 252. This terminates the flow of pressurized fluid out the port 204.

An appropriate control, therefore, may be provided by the circuit shown in FIGURE 9 to cause the valve of FIGURE 5 to assume either of its stable operating conditions. It should be pointed out the spider 224 serves merely to center the coil form 268 in the annular air gap 216 and to center the closure member 266 with respect to the valve seats 252 and 264. Under some conditions, the bi-stable valve shown in FIGURES 5 and 6 and described above has been found to operate satisfactorily without the inclusion of the spider 224.

Figure 10:
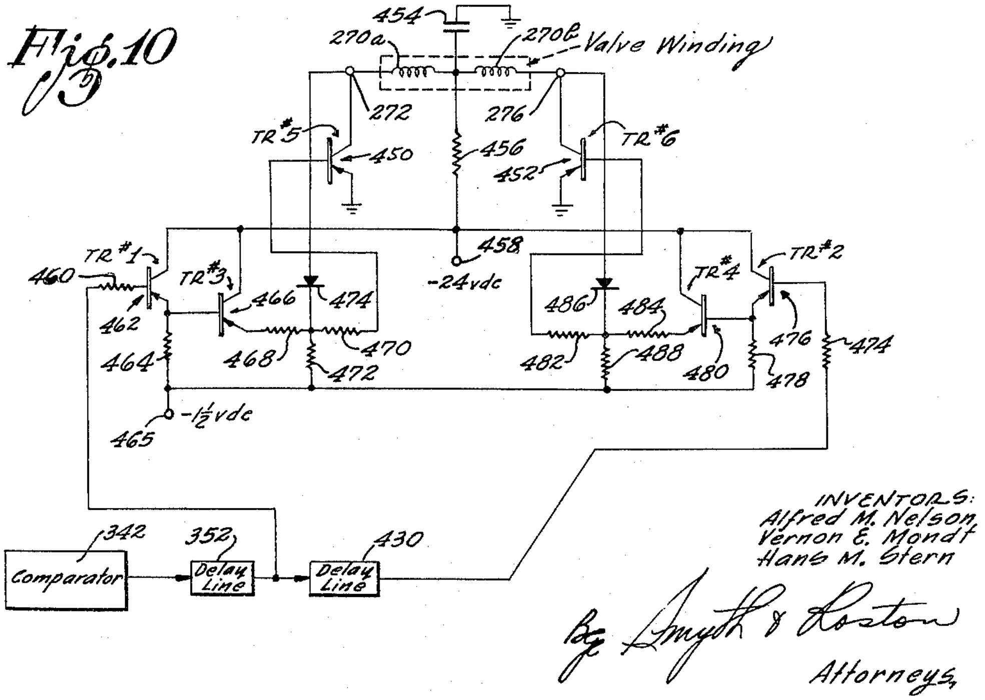
FIGURE 10 is a circuit diagram of a transistor drive for the valve assembly which, likewise, may be incorporated as a modification of the control system of FIGURE 7.

As mentioned previously, the drive circuit of FIGURE 9 may be replaced by the transistor drive circuit of FIGURE 10. In the latter circuit, a pair of power transistors 450 and 452 of any suitable type are used to replace the pentodes 400 and 402. Also, no output transformer is used in this latter circuit in its illustrated form. Instead, a center tap is taken from the valve winding 270 of FIGURE 5 so that this winding has two portions, namely, 270*a* and 270*b*. This center tap is connected to a grounded capacitor 454. The center tap is also connected to a resistor 456 which, in turn, is connected to a terminal 458. This latter terminal is connected to a suitable direct voltage exciting source. In the illustrated embodiment, the power transistors 450 and 452 are illustrated as grounded emitter, P–N–P type, and this source may have a value of −24 volts. The collectors of the transistors 450 and 452 are respectively connected to the terminals 272 and 276 associated with the valve assembly of FIGURE 5.

In the circuit of FIGURE 10, the output terminal of the delay line 352 is connected to a resistor 460, which, in turn, is connected to the base electrode of a transistor 462. The emitter electrode of the transistor 462 is connected to a resistor 464, and this latter resistor is connected to the negative terminal 465 of a direct voltage exciting source. This negative terminal may, for example, be established at a voltage of −1.5 volts. The transistor 462 is assumed to be of the P–N–P type, and its collector is connected to the terminal 458.

The emitter electrode of the transistor 462 is connected to the base electrode of a P–N–P transistor 466. The collector of the latter transistor is connected to the terminal 458, and its emitter is connected to a resistor 468. A second resistor 470 is connected between the resistor 468 and the base of the power transistor 450. A resistoı 472 is connected from the junction of the resistors 468 and 470 to the terminal 465. A diode 474 has its anode connected to the collector of the transistor 450, and the cathode of the diode is connected to the junction of the resistors 468, 470 and 472.

The delay line 430 is connected to a resistor 474, and this resistor is connected to the base of a P–N–P transistor 476. The emitter of this latter resistor is connected to a resistor 478, and this resistor is connected to the terminal 465. The collector of the transistor 476, on the other hand, is connected to the terminal 458.

The emitter of the transistor 476 is connected to the base electrode of a P-N-P transistor 480. The collector of the latter resistor is connected to the terminal 458. A pair of resistors 482 and 484 are connected in series between the emitter of the transistor 480 and the base of the power transistor 452.

A diode 486 has its anode connected to the collector of the transistor 452, and the cathode of this diode is connected to the junction of the resistors 482 and 484. A resistor 488 is connected from the junction of the resistors 482 and 484 to the terminal 465.

In the absence of a pulse from the comparator 342, the circuit illustrated in FIGURE 10 is balanced and the resultant current through the winding portions 270*a*, 270*b* is zero. Under this condition, there is a minimum voltage drop across the resistor 456, and the capacitor 454 is fully charged.

Now, when the delay line 352 develops its output pulse, this pulse is introduced to the base of the transistor 462. The transistor 462 and the transistor 466 are connected in known manner as cascaded voltage amplifiers, and an amplified pulse appears across the resistor 472 which is introduced to the base of the power transistor 450. The resulting current flow from the collector of the transistor 450 produces a current pulse in the portion 270*a* of the valve winding. This current flow is in a direction to cause the coil form 268 in FIGURE 5 to move up into the air gap 216 and cause the closure member 266 to unseat itself from the valve seat 252 and to be seated against the valve seat 264. The resulting discharge from the capacitor 454 during the first interval of the current pulse through the winding portion 270*a* produces a high current flow for the first part of the pulse and a gradual decrease toward the end of the current pulse. This initial high current flow produces the added force necessary to break the closure member 266 rapidly from the valve seat 252 and to move it through the initial area of motion at which a high velocity fluid is passing between it and the port 204 to create a relatively low pressure and a tendency for the closure member to remain against the seat 252. Then, as the closure member 266 is moved out of this vicinity the current due to the discharge of the capacitor 454 decreases so that the closure member is moved towards the valve seat 264 with less force than the force with which it was removed from the valve seat 252. This allows the closure member 266, in effect, to "coast" into engagement with the valve seat 264 to prevent bounce in the valve. The term "coasts" is intended to refer to the movement of the closure member 266 as a result of the momentum previously imparted to the member before the diminution of any force on the member.

After the interval required to transfer the card, the delay line 430 develops its output pulse, and this latter pulse is amplified in the voltage amplifier made up by the transistors 476 and 480. The amplified pulse from this amplifier causes the power transistor 452 to produce a current pulse in the portion 270*b* of the winding in the valve. The resulting action in the valve is identical to that described above, with the exception that the latter current pulse causes the coil form 268 and the closure member 266 supported by it to move down out of the air gap 216 to close the closure member 266 against the valve seat 252. Therefore, the valve of FIGURE 5 is returned to its original condition.

The diodes 474 and 486 are used to limit the current through the power transistors 450 and 452. These diodes prevent the current in the power transistors from exceeding a permissible maximum value.

The valve assembly described above, therefore, is susceptible of a simple and efficient control. Moreover, the valve assembly is capable of exceedingly high response and operational speeds, and it may be positively actuated from one to the other of its operating conditions at such high speeds without giving rise to undesired spurious operations of the valve closure member.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination, a housing constructed to provide a single chamber, a flexible spider supported by the housing and disposed in the single chamber in the housing for flexure in a direction transverse to the plane of support of the spider, there being a valve port within the single chamber of the housing on one side of the spider, a single closure member supported by the spider for movement in accordance with the flexure of the spider and disposed in contiguous relationship to the valve port for movement to a first position in cooperative relationship with the port to close the port, there being an exhaust port within the single chamber of the housing on the other side of the spider from the valve port, the spider being constructed to provide a uniform pressure on opposite sides of the closure member, the closure member also being disposed in contiguous relationship to the exhaust port for movement to a second position in cooperative relationship with the port to close the port, and means operative upon the closure member for applying an instantaneous force to the closure member to move the closure member to the first position in cooperative relationship with the valve port for the first operating condition of the closure member and to move the closure member to the second position in cooperative relationship with the exhaust port for the second operating condition of the closure member.

2. In combination, a housing, the housing being constructed to provide a single chamber and to obtain the introduction of pressurized fluid into the single chamber in the housing, there being a valve port within the single chamber of the housing to receive pressurized fluid introduced into the single chamber of the housing, means including a closure member supported by the housing and movable in the housing to a first position in cooperative relationship with the valve port to close the valve port, there being an exhaust port within the single chamber of the housing at the opposite side of the closure member from the valve port, the closure member being positioned for movement to a second position in cooperative relationship with the exhaust port to close the port, the closure means being disposed in the single chamber in the housing and constructed to provide an equalization of pressures in the single chamber in the housing on opposite sides of the closure means, electrically-actuated means coupled to the closure member and responsive to electrical pulses of a first polarity to bring the closure member to the first position in cooperative relationship with the valve port and responsive to electrical pulses of a second polarity to bring the closure member to the second position in cooperative relationship with the exhaust port, means coupled to the housing for introducing pressurized fluid into the single chamber in the housing to maintain the closure member in cooperative relationship with the particular port to which it is actuated by the electrical pulses, and means coupled to the electrically actuated means for introducing electrical pulses of the first and second polarities to such means at different times to control the positioning of the closure member.

3. In combination, a valve housing, the housing being constructed to provide a single chamber and to obtain the introduction of pressurized fluid into the single chamber in the housing, a closure member supported by the housing for movement within the single chamber in the housing, there being a valve port within the single chamber in the housing and there being in the valve port a seat disposed in contiguous relationship to the closure member to become closed upon a movement of the closure member to a first position in a direction toward the valve seat, there being an exhaust port within the single chamber in the housing and there being in the valve port a seat disposed in contiguous relationship to the closure member to become closed upon a movement of the closure member to a second position in a direction toward the exhaust port, magnetic means supported by the housing, a movable electric winding coupled to the closure member for movement with the closure member and disposed in coupled relationship to the magnetic means for the production of a force against the winding by the magnetic means to obtain a movement of the closure member to the first position upon the introduction of an electric pulse of one polarity to the windings and for a movement of the closure member to the second position upon the introduction of an electric pulse of the opposite polarity to the winding, means coupled to the housing for introducing pressurized fluid to the single chamber in the housing to maintain said closure member seated against the valve seat and the port seat upon the termination in the introduction of the pulse to the winding, and means coupled to the winding for introducing pulses of first and second polarities to the winding at different times to obtain a controlled movement of the closure member in accordance with the polarity of such pulses.

4. In combination, a valve housing, the housing being constructed to provide a single chamber and to obtain the introduction of pressurized fluid into the single chamber in the housing, a resilient spider supported by the housing and disposed across the housing in the single chamber in the housing and in flexible relationship to the housing, there being a valve port in the single chamber in the housing on one side of the spider and there being a seat in the valve port, there being an exhaust port in the housing on the other side of the spider and there being a seat in the exhaust port, a closure member supported by the spider and centered by the spider for movement in accordance with the flexure of the spider and provided with portions for closing the valve port and the exhaust port in accordance with the movements of the closure member, magnetic means including a permanent magnet supporting by the housing and having an annular air gap for producing magnetic flux in such air gap, a winding coupled to said closure member and centered in said air gap by the spider for movement with the spider for attraction and repulsion into and out of the air gap in accordance with the polarity of a current pulse through the winding and in accordance with the flux from the permanent magnet to obtain a movement of the closure member into selective cooperative relationship with the valve port and the exhaust port, means coupled to the housing for introducing pressurized fluid into the single chamber in the housing for flow through a selected one of the valve port and the exhaust port to maintain the closure member seated against the valve seat and the port seat upon the termination of the current pulse through the winding, and means coupled to the winding for introducing pulses of first and second polarities to the winding at selected times to obtain a disposition of the closure member in accordance with the polarity of such pulses.

5. In combination, a housing, means including a permanent magnet forming with the housing a magnetic circuit including an annular air gap having a uniform magnetic flux extending radially thereacross, a spider disposed across the housing and supported by the housing for flexure in a direction extending axially with respect to the air gap and constructed to obtain a uniform pressure on opposite sides of the spider, a coil form carried by the spider for movement with the spider and extending into the air gap and centered in the air gap by the spider, a winding fixedly disposed on the coil form and constructed to pass current pulses of a first and second polarity and disposed to produce movement of the coil form and the winding into and out of the air gap in response to such current pulses and to the magnetic field produced by the permanent magnet, a closure member supported by the coil form for movement in accordance with the movement of the coil form into and out of the air gap, there being a valve port in the housing and there being a valve seat in the valve port in contiguous relationship to the closure member on one side of the spider for closure with the closure member upon the flexure of the spider to obtain a disposition of the closure member against the valve seat, there being an exhaust port in the housing and there being a seat in the exhaust port in contiguous relationship to the closure member on the opposite side of the spider for closure upon a flexure of the spider to obtain a disposition of the closure member against the valve seat, the housing being constructed to obtain the introduction of fluid under pressure into the housing, means coupled to the housing for introducing fluid under pressure into the housing for flow through a selected one of the valve port and the exhaust port to maintain the closure member selectively against the valve port and the exhaust port after the interruption of any current flow through the winding and until the production of a current flow of the opposite polarity in the winding, and means coupled to the winding for introducing current pulses of first and second polarities to the winding at selected times to control the positioning of the closure member in accordance with the polarity of the pulses.

6. In a card processing system, the combination of: magnetic means for providing a magnetic flux, electric winding means supported for reciprocal motion in said magnetic flux, a valve housing surrounding and supporting said winding means and constructed to define a single chamber, there being an exhaust port in the housing, valve closure means including a single closure member disposed in the single chamber of the housing and coupled to said winding means in spaced relation with said port and operative to close the exhaust port upon reciprocal motion of said winding means, the valve housing being constructed to obtain the introduction of fluid under pressure into the housing, means coupled to the housing for introducing fluid under pressure into the single chamber in the housing, the single closure member being disposed within the single chamber in the housing, and means coupled to the electric winding means for obtaining the flow of an electric current pulse through said winding means to cooperate with the magnetic flux from said magnetic means in causing said closure means to close said exhaust port and to be maintained in closed relationship with the exhaust port by the pressure of fluid entering said valve housing even after the interruption in the electric current pulse.

7. An electro-magnetically actuated valve including: a housing constructed to provide a single chamber, the housing being constructed to provide for an introduction of fluid under pressure into the single chamber in the housing, magnetic means supported by the housing for providing a magnetic flux, electric winding means supported by the housing for reciprocal motion in said magnetic flux, there being an exhaust port in the single chamber of the housing, and valve closure means including a single closure member disposed in the single chamber of the housing and coupled to said winding means in spaced relation with said exhaust port and movable with the winding means and disposed to close the exhaust port upon reciprocal motion of said winding means as a result of a flow of an electric current pulse through said winding means and the provision of the magnetic flux by the magnetic means and for a holding of the closure means in the exhaust port by the pressure of fluid entering the single chamber in the housing even after the interruption in the current pulse, means operatively coupled to the housing to obtain the introduction of fluid under pressure into the single chamber in the housing, and means coupled to the winding means for applying a current pulse to the winding means.

8. An electro-magnetically actuated valve including: means including a permanent magnet for providing an annular air gap and for developing a magnetic flux in said air gap, a cylindrical coil form dimensioned to extend into said air gap, an electric winding disposed on said coil form for passing an electric current, a valve housing constructed to define a single chamber and supporting said winding and coil form for movement in said chamber, there being a first hollow tubular exhaust port in the single chamber of said valve housing and there being a first valve seat in the exhaust port in facing relation with said coil form, there being in the single chamber of the housing a second hollow tubular exhaust port axially aligned with said first exhaust port and there being a second valve seat in the second exhaust port in spaced relationship with said first valve seat, and valve poppet means disposed in the single chamber of the housing and coupled to said coil form for movement with the coil form and including a single closure member positioned between said first and second valve seats to close with respective ones of said first and second valve seats in accordance with the polarity of an electric current in the winding and in accordance with the magnetic flux produced by the permanent magnet, and means coupled electrically to the winding for producing currents of first and second polarities in the winding at different times to control the positioning of the valve poppet means.

9. In combination, a housing constructed to define a single chamber, there being a valve port at a first position in the single chamber of the housing, there being an exhaust port at a second position in the single chamber of the housing, a single closure member supported by the housing and disposed within the single chamber in the housing and movable to the first position in the single chamber to close the valve port and movable to the second position in the single chamber to close the exhaust port, the valve and exhaust ports being provided with parameters relative to the housing to produce pressures in the housing for maintaining the closure member against either the valve port or the exhaust port upon a movement of the closure member against the particular port and after the interruption of any moving force on the closure member, the housing being constructed to provide for the introduction of fluid under pressure into the single chamber in the housing, means operatively coupled to the housing for introducing fluid under pressure into the single chamber in the housing, and means coupled to the closure member for applying an instantaneous force against the closure member to move the closure member against a particular one of the ports.

10. The combination as set forth in claim 9 in which an electrical winding is coupled to the closure member for movement with the closure member and is disposed in a magnetic field to produce a force for moving the closure member to the first and second positions upon the introduction of an electrical pulse to the winding and in accordance with the polarity of such pulse and the polarity of the magnetic field and in which means are included to apply electrical pulses of first and second polarities to the winding for producing instantaneous forces for moving the closure member.

11. In combination, a housing constructed to provide a single chamber, the housing being constructed to provide for the introduction of fluid into the single chamber of the housing, a flexible spider supported by the housing in the single chamber for flexure in a direction transverse to the plane of support of the housing, there being a valve port in the single chamber of the housing on one side of the spider, a closure member supported on the spider in the single chamber of the housing for movement in accordance with the flexure of the spider and disposed in contiguous relationship to the valve port for movement into cooperative relationship with the port to close the port, means coupled to the housing for introducing a fluid into the housing, means supported within the valve housing on the other side of the single chamber in the housing from the valve port to produce a back pressure in the fluid in the single chamber of the housing to maintain the closure member in cooperative relationship with the valve port upon a movement of the closure member into such cooperative relationship and after the interruption of any moving force on the closure member, and means coupled to the closure member for applying an instantaneous force to the closure member to move the closure member into cooperative relationship with the valve port.

12. The combination set forth in claim 11 in which means are provided on the opposite side of the spider from the valve port to produce an exhaust port and in which holes are provided in the spider to obtain a fluid of the same pressure throughout the single chamber in the housing in the space between the valve and exhaust ports.

13. In combination, a housing constructed to provide a single chamber, a flexible spider supported by the housing and disposed across the single chamber of said housing, there being a valve within the single chamber of the housing to receive fluid introduced into the housing, a closure member suitably supported on the spider for movement into cooperative relationship with the valve in accordance with the flexure of the spider to close the valve, there being an exhaust port within the single chamber of the housing at the opposite side of the spider from the valve for providing a cooperative relationship with the closure member in accordance with the flexure of the spider to close the exhaust port, and means operative upon the spider for imposing a force in a first direction on the spider to flex the spider in a direction for bringing the closure member into cooperative relationship with the valve and for imposing a force in a second direction opposite to the first direction on the spider to flex the spider in a direction for bringing the closure member into cooperative relationship with the exhaust port, the single chamber of the housing being provided with dimensions relative to the valve, the exhaust port and the closure member to maintain the closure member in cooperative relationship with the valve and exhaust member upon an interruption in the force bringing the closure member into such cooperative relationship.

14. In combination, a valve housing constructed to define a single chamber, the housing being constructed to provide for the introduction of fluid into the single chamber in the housing, a resilient spider supported by the housing and disposed across the single chamber of the housing in flexible relationship to the housing, a closure member mounted on the spider for movement with the resilient spider, a valve member supported by the housing, there being a valve port in the valve member in contiguous relationship to the closure member to become closed upon a flexure of the spider in a direction toward the valve member, the valve member being provided with parameters relative to the housing to produce a build-up of fluid pressure in the housing upon a closure of the valve port, an exhaust member supported by the housing, there being an exhaust port in the exhaust member in contiguous relationship to the closure member to become closed upon a flexure of the spider in a direction toward the exhaust member, magnetic means supported by the housing, a winding supported by the spider and disposed in magnetically coupled relationship to the magnetic means to receive a force from the magnetic means for a flexure of the spider toward the valve member at first particular times and toward the exhaust member at second particular times upon the introduction of an electrical pulse to the winding and in accordance with the polarity of such pulse, means coupled to the housing for providing an introduction of fluid to the single chamber in the housing, and means electrically coupled to the winding for obtaining the introduction of electrical pulses of the first and second polarities to the winding at different times to control the positioning of the closure member in accordance with the polarity of the pulses.

References Cited in the file of this patent

UNITED STATES PATENTS

| | | |
|---|---|---|
| 1,595,478 | Minton | Aug. 10, 1926 |
| 2,263,819 | Ray | Nov. 25, 1941 |
| 2,579,723 | Best | Dec. 25, 1951 |
| 2,582,088 | Walthers | Jan. 8, 1952 |
| 2,637,343 | Matthews | May 5, 1953 |
| 2,661,022 | Latour | Dec. 1, 1953 |
| 2,750,961 | Uritis | June 19, 1956 |
| 2,752,154 | Nelson | June 26, 1956 |
| 2,795,328 | Tyler | June 11, 1957 |
| 2,887,255 | Bauerlein | May 19, 1959 |

FOREIGN PATENTS

| | | |
|---|---|---|
| 1,012,005 | France | Apr. 9, 1952 |